United States Patent

Matsumoto et al.

[11] Patent Number: 5,819,867
[45] Date of Patent: Oct. 13, 1998

[54] ELECTRICALLY POWERED BICYCLE

[75] Inventors: Toshihiro Matsumoto, Nishiwaki; Tatsuaki Tanaka, Kasai; Toshihiro Suhara, Taka-gun, all of Japan

[73] Assignee: Sanyo Electric Co., Ltd., Osaka, Japan

[21] Appl. No.: 607,357

[22] Filed: Feb. 27, 1996

[30] Foreign Application Priority Data

Mar. 27, 1995 [JP] Japan ................................. 7-068083

[51] Int. Cl.$^6$ ................................................. B62M 23/02
[52] U.S. Cl. ............................................. 180/206; 180/220
[58] Field of Search ................................. 180/205, 206, 180/207, 220, 65.1, 65.2, 65.8, 907

[56] References Cited

U.S. PATENT DOCUMENTS

| | | | |
|---|---|---|---|
| 3,921,745 | 11/1975 | McCulloch et al. | 180/220 |
| 3,939,932 | 2/1976 | Rosen | 180/206 |
| 4,364,448 | 12/1982 | Ikuma | 180/206 |
| 5,024,286 | 6/1991 | Lean et al. | 180/206 |
| 5,375,676 | 12/1994 | Takata et al. | 180/220 |
| 5,505,277 | 4/1996 | Suganuma et al. | 180/206 |
| 5,602,448 | 2/1997 | Yaguchi | 180/206 |

FOREIGN PATENT DOCUMENTS

| | | |
|---|---|---|
| 0635423 | 7/1994 | European Pat. Off. . |
| 4100790 | 4/1992 | Japan . |
| 5-50977 | 3/1993 | Japan . |
| 5246378 | 9/1993 | Japan . |
| 7-212904 | 8/1995 | Japan ................................. 180/206 |

OTHER PUBLICATIONS

English Language Abstract of Japanese Patent Publication No. HEI 4100790.
English Language Abstract of Japanese Patent Publication No. HEI 5–246378.
European Search Report and Annex.

*Primary Examiner*—Paul N. Dickson
*Attorney, Agent, or Firm*—Greenblum & Bernstein, P.L.C.

[57] ABSTRACT

An electrically powered bicycle that is driven by a main driving force generated by pedaling and an auxiliary driving force, including: a motor for generating the auxiliary driving force, a battery for supplying electric power to the motor, an acceleration sensor for detecting running acceleration of the electrically powered bicycle, and control device for controlling the electric power to be supplied to the motor so that the motor outputs the auxiliary driving force in accordance with the running acceleration thus detected.

10 Claims, 5 Drawing Sheets

ELECTRICALLY POWERED BICYCLE

BACKGROUND OF THE INVENTION

1. Field of the Invention

The present invention relates to electrically powered bicycles and, more particularly, to an electrically powered bicycle with a motor used as an auxiliary driving force for assisting pedaling.

2. Description of Related Art

Conventional electrically powered bicycles include a bicycle comprising a pedaling sensor for detecting a main driving force generated by pedaling and a battery current sensor for detecting motor torque based on a battery current supplied from a battery to a motor, in which an auxiliary driving force is generated by a motor and controlled based on an output from the sensor (see, for example, Japanese Unexamined Patent Publication No. HEI 4(1992)-100790), and a bicycle with a motor for outputting an auxiliary driving force only when a main driving force exceeds a predetermined value (see, for example, Japanese Unexamined Patent Publication No. HEI 5(1993)-246378).

However, these conventional electrically powered bicycles showed a problem that, at running with the main driving force, the motor is not readily controlled with good timing to provide the auxiliary driving force.

SUMMARY OF THE INVENTION

The present invention has been made in view of the above circumstances, and provides an electrically powered bicycle with a motor for outputting a required auxiliary driving force in accordance with running acceleration of the electrically powered bicycle to properly assist running with a main driving force.

The present invention provides an electrically powered bicycle that is driven by a main driving force generated by pedaling and an auxiliary driving force, comprising a motor for generating the auxiliary driving force, a battery for supplying electric power to the motor, an acceleration sensor for detecting running acceleration of the electrically powered bicycle, and control means for controlling the electric power to be supplied to the motor so that the motor outputs the auxiliary driving force in accordance with the running acceleration thus detected. The motor outputs the auxiliary driving force in accordance with the acceleration of the bicycle, thereby reducing the main driving force required at the time of the acceleration to facilitate driving.

DESCRIPTION OF THE PREFERRED EMBODIMENT

Figure 1:
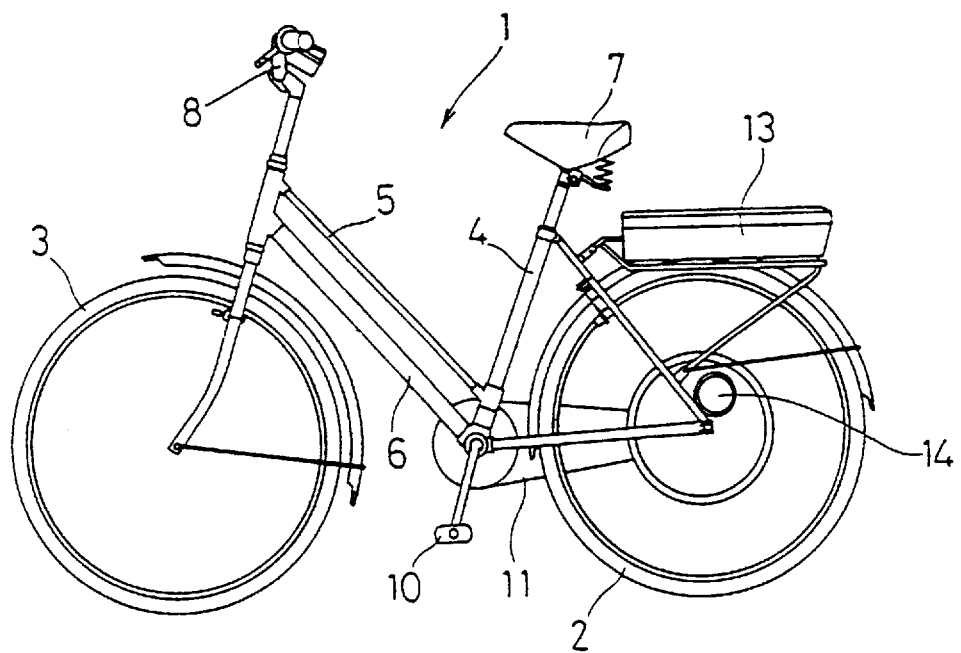
FIG. 1 is a side view of an electrically powered bicycle in accordance with one embodiment of the present invention.

The main driving force referred to in the present invention is, as seen in conventional bicycles, a force transmitted to a driving wheel by a rider's pushing on pedals, and a mechanical transmission system for transmitting the main driving force from the pedals to the driving wheel can be any means known in conventional bicycles.

The auxiliary driving force is a driving force auxiliarily provided from the motor to the driving wheel.

Preferably, the bicycle further comprises a pedaling sensor for detecting the main driving force and a stopping means for stopping the output of the auxiliary driving force of the motor when the pedaling sensor does not detect the main driving force. This is due to the following reason. When the bicycle is naturally accelerated without the main driving force, for example, on a downward slope, it is preferable to stop the supply of the auxiliary driving force so as to drive the bicycle safely.

In this case, the pedaling sensor may comprise a combination of an element for generating a mechanical strain or deformation and a sensor for converting the strain or deformation into an electric signal. The element is disposed in the mechanical transmission system for the main driving force to generate a mechanical strain or deformation caused by the main driving force. The sensor may be, for example, a strain gauge, a potentiometer or a differential transformer.

To transmit the auxiliary driving force from the motor to the driving wheel of the bicycle, there are employed means for transmitting the output from the motor to the rotary axle of the driving wheel via a gear of several stages, a belt or a chain, means for transmitting the output from the motor to a tire or a rim of the driving wheel after the rotation speed of an output shaft of the motor is reduced by a gear, and the like.

Preferably, the motor and the driving wheel are connected together via a one way clutch to prevent supply of damping force from the motor to the driving wheel when the driving wheel has a higher rotation speed than is given by the motor.

The motor may be, for example, a brushless motor or a brush motor, among which a DC brush motor is preferably used because of the facility in control. The battery may be, for example, a dry battery such as a manganese battery, a mercury battery or an alkali-manganese battery or a rechargeable battery such as a lead storage battery, an alkali storage battery, a silver oxide-zinc storage battery, a silver oxide-cadmium battery or a nickel-cadmium battery.

The battery may be detachably housed in a casing provided above the driving wheel or detachably housed inside a tubular pipe that constitutes the body frame of the bicycle.

The running acceleration sensor can be a piezoelectric acceleration sensor (manufactured by, for example, YAMCO CO., LTD. in Japan, 201S type), a servo acceleration meter (manufactured by TOKIMEC INC. in Japan, TA25 type) and a linear acceleration meter (manufactured by TOKYO AIRCRAFT INSTRUMENT CO., LTD. in Japan, 4311 type). Alternatively, the running acceleration sensor may be a combination of a speed sensor with a circuit for differentiating an output of the speed sensor to give acceleration.

The control means may be constituted of a switching element (e.g., switching transistor and thyristor) for supplying electric power from the battery to the motor and of a duty control circuit for controlling a duty factor of the switching element in accordance with the running acceleration.

In this case, the duty control circuit turns the switching element on and off by outputting a pulse signal with a predetermined frequency of, for example, on the order of 100 to 1000 Hz or 1 to 10 ms to vary its duty factor for placing the motor under PWM control. It should be noted that the duty factor of the switching element is a ratio of the time for "on" relative to a predetermined frequency when the switching element is turned on and off at the frequency.

The speed sensor is a sensor for detecting the running speed of the electrically powered bicycle. Examples of the speed sensor are a rotary encoder and a tachogenerator for measuring the rotation speed of the driving wheel.

The controlling means controls the electric power to be supplied to the motor such that the motor outputs the auxiliary driving force in accordance with the detected running acceleration. Thus, the auxiliary driving force is outputted at the time of acceleration when an increased driving force is required, thereby facilitating acceleration of the electrically powered bicycle with less pedaling effort.

The present invention will hereinafter be described in detail by way of an embodiment thereof shown in the attached drawings. This embodiment is not intended to limit the present invention.

Figure 2:
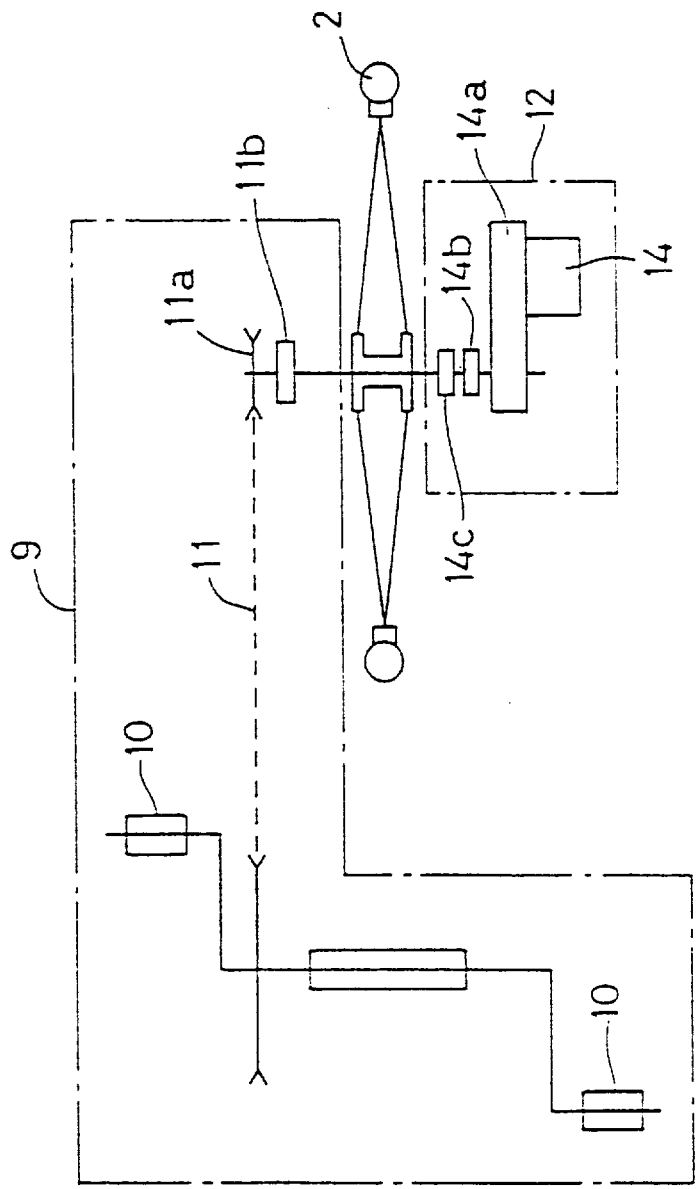
FIG. 2 is an explanatory view for the construction of a driving system of the electrically powered bicycle of FIG. 1.

FIG. 1 is a side view of an electrically powered bicycle in accordance with one embodiment of the present invention. FIG. 2 is an explanatory view for the construction of the driving system of the electrically powered bicycle.

In these drawings, a body 1 of the electrically powered bicycle has a driving wheel 2 that is driven by pedaling means 9 and motor means 12, and a front wheel 3 for determining a running direction. The body 1 has a frame constituted of a seat tube 4, a top tube 5 and a down tube 6, and on the upper end of the seat tube 4 is mounted a saddle 7. Upper from an intersection of the top tube 5 and the down tube 6 is provided a handle 8 for determining a direction of the front wheel 3.

The pedaling means 9 for driving the driving wheel 2 is provided with, like conventional bicycles, pedals 10 so that a rider pushes and rotates the pedals 10 by his feet to transmit driving force (referred to also as pedaling force) to a chain 11 and then to the driving wheel 2 via a sprocket 11a and a one way clutch 11b, thereby driving the driving wheel 2.

The one way clutch 11b is such that, when the driving wheel 2 has a higher rotation speed than the pedaling force intends to give to the driving wheel 2, the one way clutch 11b prevents adverse transmission of the driving force from the driving wheel 2 to the chain 11.

The motor means 12 that drives the driving wheel 2 in association with the pedaling means 9 is powered by a rechargeable battery 13 disposed over the driving wheel 2, and supplies electric power from the battery 13 to a motor 14 provided on a hub of the driving wheel 2.

In the motor means 12, an output from the motor 14 is reduced by a speed reducer mechanism 14a including a gear and a belt, and is transmitted to the driving wheel 2 via a one way clutch 14b and a speed sensor 14c. The one way clutch 14b is such that, when the driving wheel 2 has a higher rotation speed than the motor 14 intends to give to the driving wheel 2, the one way clutch 14b prevents adverse transmission of the driving force from the driving wheel 2 to the motor 14.

The speed sensor 14c, disposed on the rotary axle of the driving wheel 2, is a rotary encoder that outputs pulses with a frequency proportional to the rotation speed of the driving wheel 2.

Figure 3:
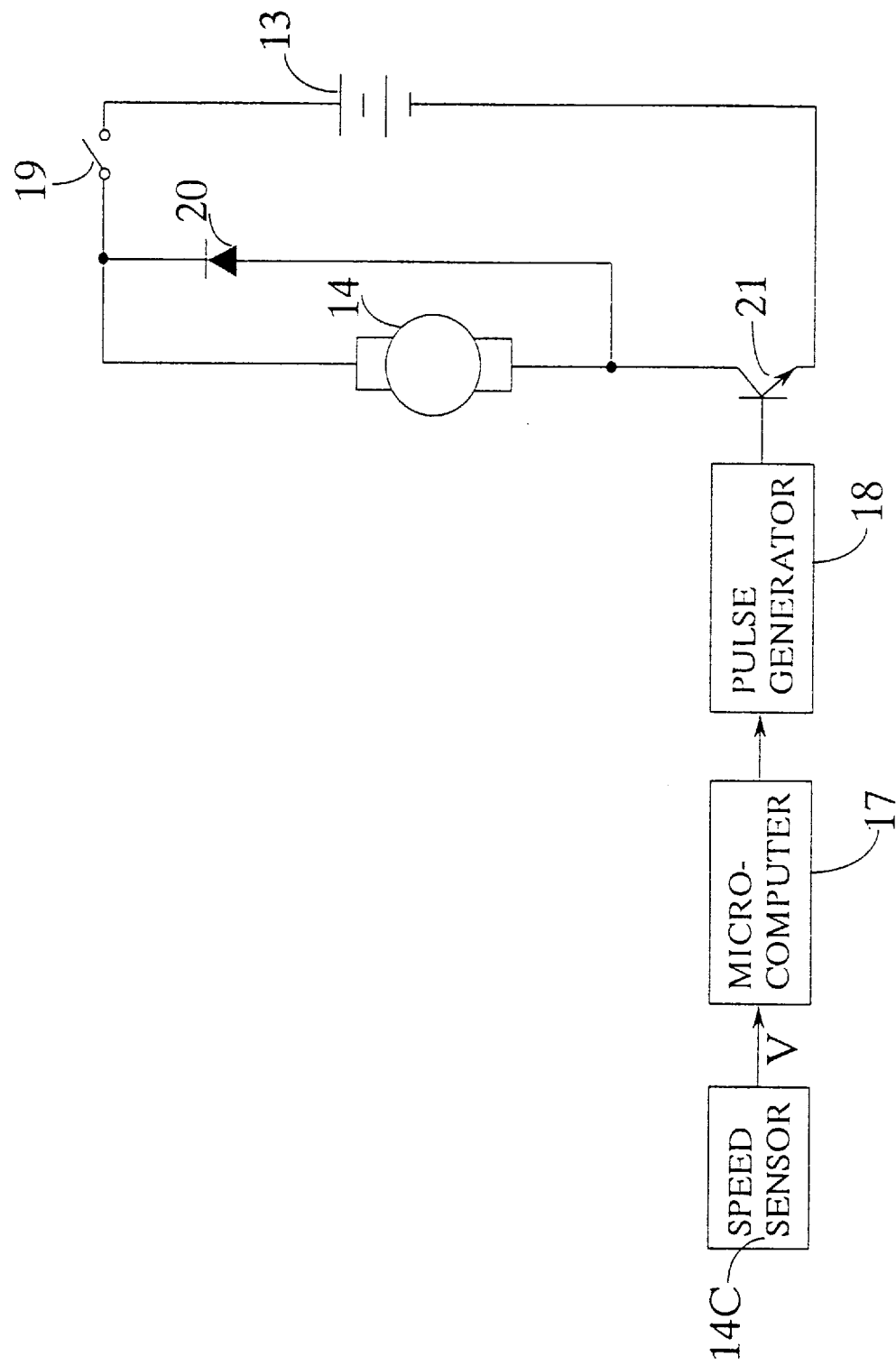
FIG. 3 is a control circuit in the embodiment.

Now turning to FIG. 3, a control circuit of the electrically powered bicycle will be detailed.

A voltage from the battery 13 is applied to the motor 14 via a switching element 21 and a power supply switch 19. In parallel to the motor 14 is arranged and connected thereto a flywheel diode 20, as shown in FIG. 3.

Reference numeral 17 denotes a microcomputer including a CPU, a ROM and a RAM, which carries out a signal processing on receipt of an output signal from the speed sensor 14c and sends a duty control signal to a pulse generator 18.

The pulse generator 18, on receipt of the duty control signal from the microcomputer 17, controls a duty factor of the switching element 21.

In this embodiment, a DC brush motor of the permanent magnetic type (maximum output: 300 W) is employed as the motor 14 and a nickel-cadmium battery of 24V and 5 Ah as the battery 13.

The microcomputer 17 turns the switching element 21 on and off with a frequency of 244 Hz to place the motor 14 under PWM (pulse width modulation) control.

Such a construction of the electrically powered bicycle allows the pedaling force generated by the rider's pushing on the pedals 10 to be transmitted to the driving wheel 2 via the chain 11.

Figure 4:
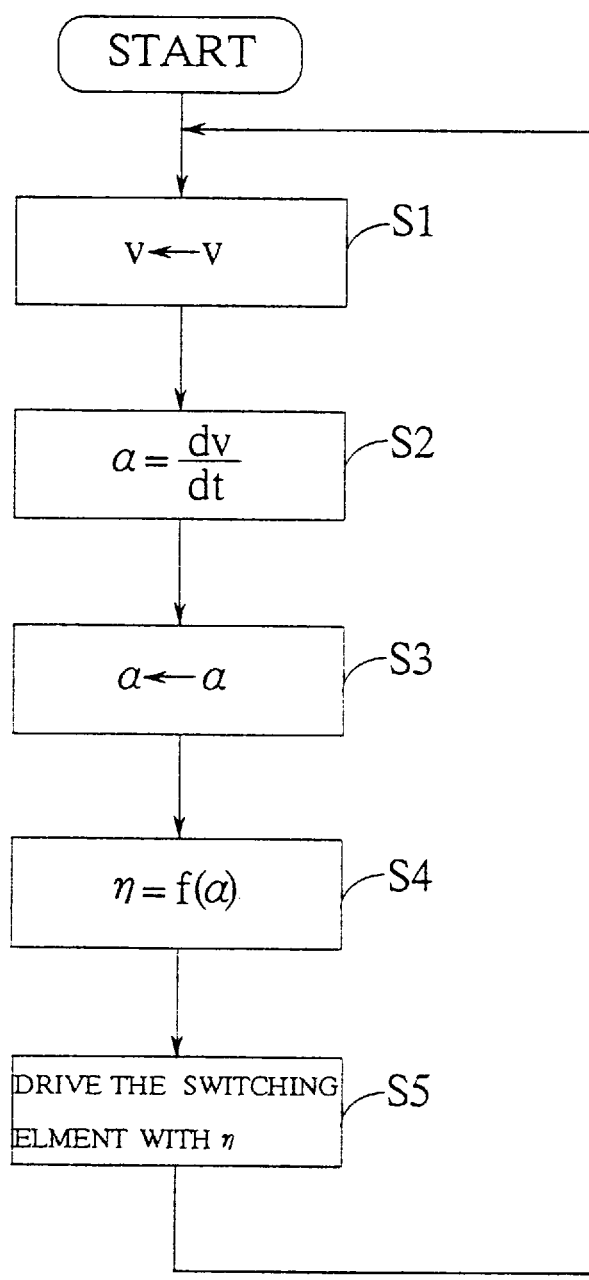
FIG. 4 is a flowchart illustrating the operation of the embodiment.

As shown in the flowchart of FIG. 4, the microcomputer 17 senses a speed v from the output signal of the speed sensor 14c (step S1), differentiates the speed v to give acceleration $\alpha$ (steps S2 and S3), determines a duty factor $\eta$ based on a function or table which is preestablished such that, with the increase of the acceleration $\alpha$, the duty factor becomes higher (step S4), and drives the switching element 21 with the duty factor $\eta$ thus obtained (step S5).

Figure 5:
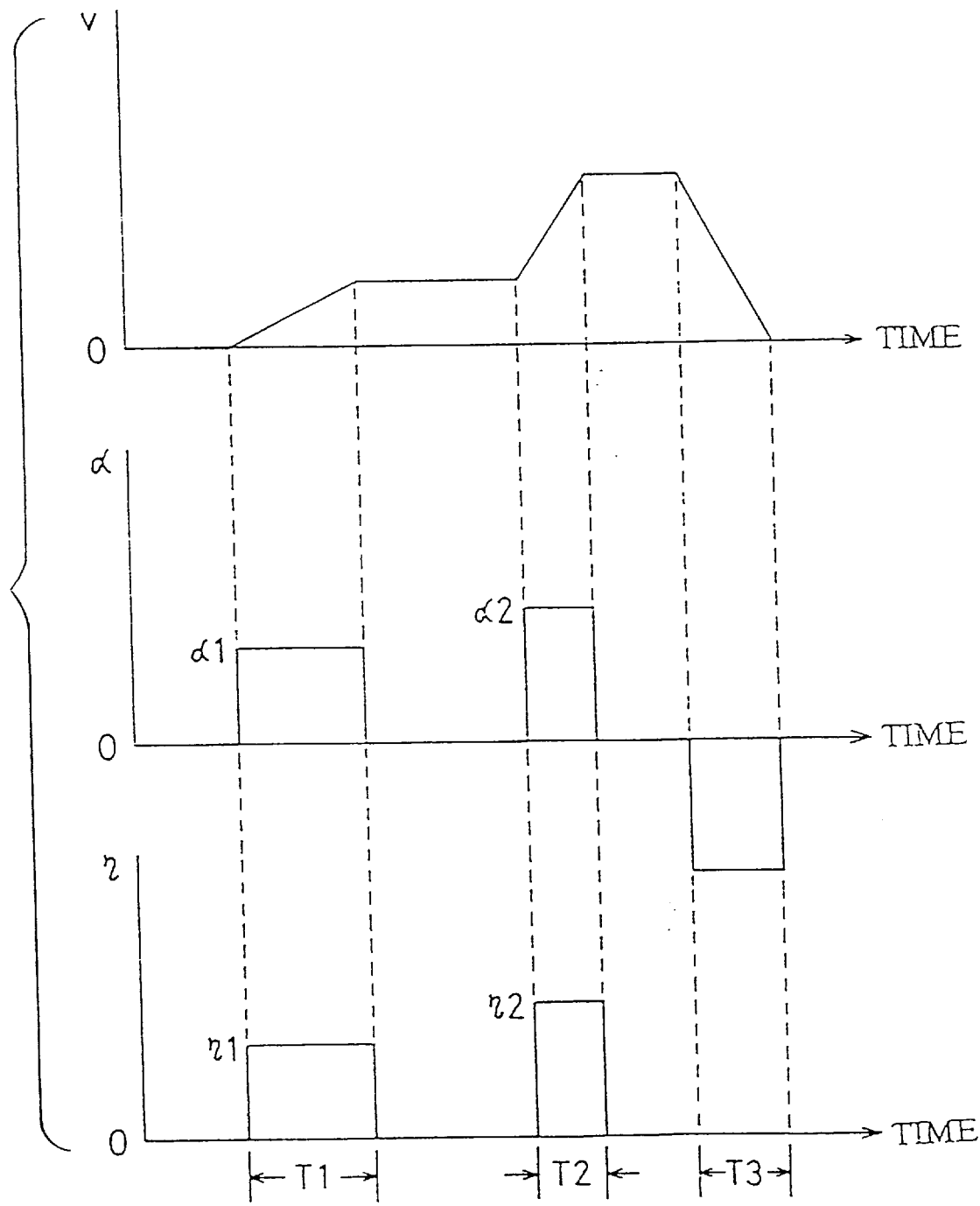
FIG. 5 is a time chart illustrating the operation of the embodiment.

FIG. 5 is a time chart illustrating the change in accordance with time of the speed v, the acceleration $\alpha$ and the duty factor $\eta$ for the above control. Along with the rider's push on the pedals 10, the speed v starts to increase to give acceleration $\alpha 1$. With duty factor $\eta 1$ which is determined based on the acceleration $\alpha 1$, electric power is supplied from the battery 13 to the motor 14, thus giving auxiliary power to the bicycle (time T1).

If the rider makes harder pushing on the pedals 10 for further acceleration (time T2) to give acceleration $\alpha 2$, auxiliary driving force is given to the electrically powered bicycle with duty factor $\eta 2$ determined based on the acceleration $\alpha 2$. It should be noted that at time T3 for speed reduction with $\alpha < 0$, the auxiliary driving force is not outputted.

Thus, the auxiliary driving force is provided in accordance with acceleration, thereby reducing main driving force required at the time of acceleration of the electrically powered bicycle for facilitated driving.

In accordance with the present invention, the motor outputs the auxiliary driving force in accordance with acceleration of the electrically powered bicycle, thereby reducing the pedaling force required at the time of acceleration of the electrically powered bicycle for facilitated driving.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. An electrically powered bicycle driven by a main driving force, generated by pedaling, and an auxiliary driving force, comprising:

a motor for generating the auxiliary driving force;

a battery for supplying electric power to the motor;

an acceleration sensor for detecting running acceleration of the electrically powered bicycle; and control means for controlling the electric power supplied to the motor, said control means controls the motor to increase the auxiliary driving force responsive to an increase in the detected running acceleration.

2. An electrically powered bicycle of claim 1, in which the control means comprises a switching element for supplying electric power of the battery to the motor and a duty control circuit for controlling a duty factor of the switching element in accordance with the running acceleration, the duty control circuit providing a higher duty factor with an increase of the running acceleration.

3. An electrically powered bicycle of claim 1, in which the acceleration sensor comprises a combination of a speed sensor with a circuit for differentiating an output of the speed sensor to give acceleration.

4. An electrically powered bicycle of claim 2, in which the duty control circuit turns the switching element on and off by outputting a pulse signal with a predetermined frequency to vary its duty factor for placing the motor under pulse width modulation control.

5. An electrically powered bicycle of claim 3, in which the speed sensor comprises a rotary encoder.

6. An electrically powered bicycle of claim 1 further comprising a pedaling sensor for detecting the main driving force and a stopping means for stopping an output of the motor when the pedaling sensor does not detect the main driving force.

7. An electrically powered bicycle of claim 6 further comprising a pedal, a driving wheel and a mechanical transmission system for transmitting the main driving force from the pedal to the driving wheel, the pedaling sensor comprising a sensor for detecting a strain of a part of the mechanical transmission system to convert the strain into an electric signal.

8. An electrically powered bicycle of claim 1 further comprising a driving wheel driven by the motor and a one way clutch, the motor and the driving wheel being connected together via the one way clutch to prevent supply of damping force from the motor to the driving wheel when the driving wheel has a higher rotation speed than is given by the motor.

9. An electrically powered bicycle of claim 2, in which the duty control circuit comprises a circuit for determining the duty factor based on a function which is preestablished such that the duty factor becomes higher with an increase of the running acceleration.

10. An electrically powered bicycle of claim 4, in which the predetermined frequency is a constant frequency in the range between 100 and 1000 Hz.

* * * * *